Dec. 26, 1939.   F. M. ALLEN   2,184,971
FLEXIBLE SMOOTH SURFACE RUG AND METHOD OF MAKING SAME
Original Filed Sept. 2, 1936   3 Sheets-Sheet 1
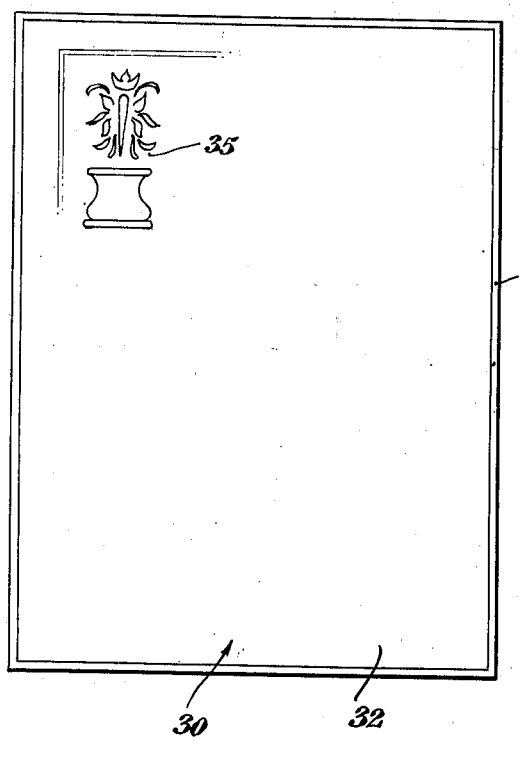
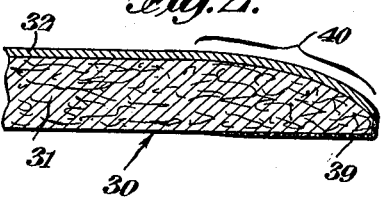
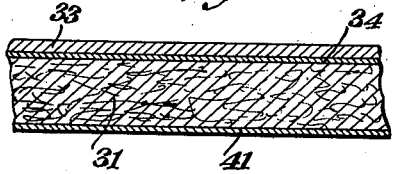
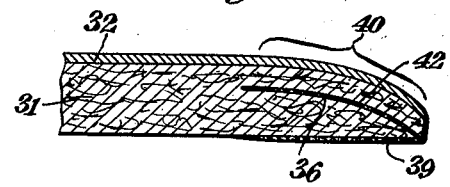
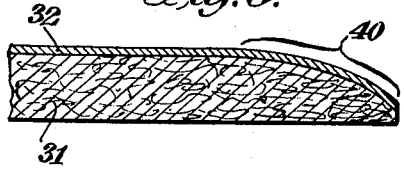
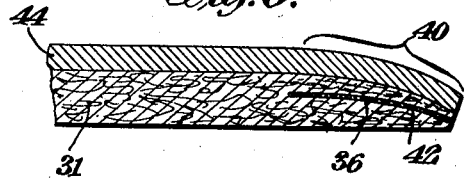
INVENTOR
FRANK M. ALLEN
BY
Gordon C. Willard
ATTORNEY

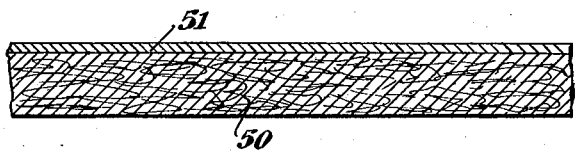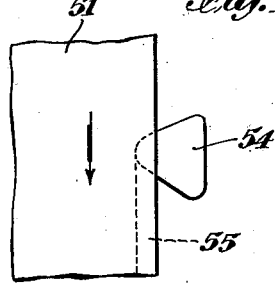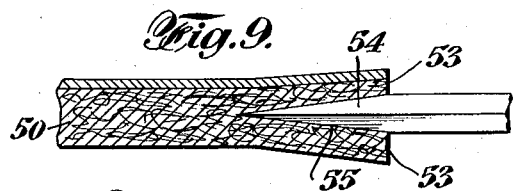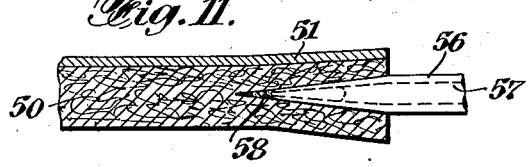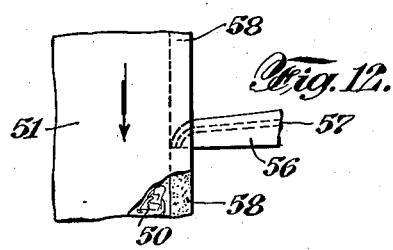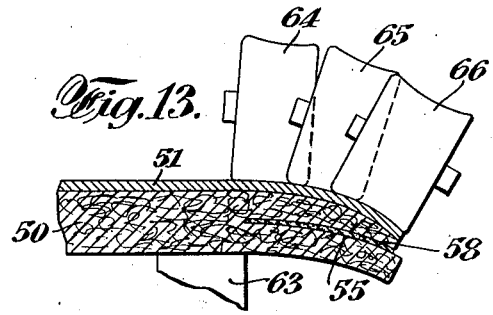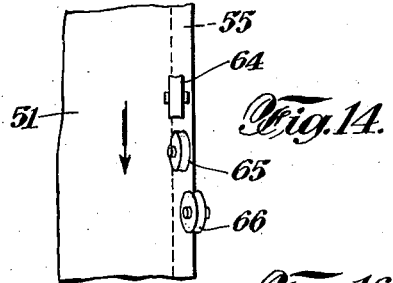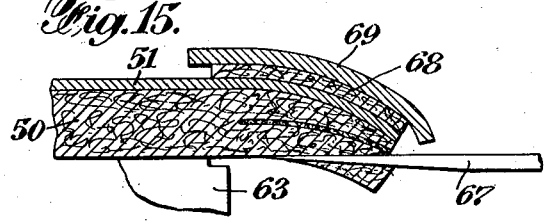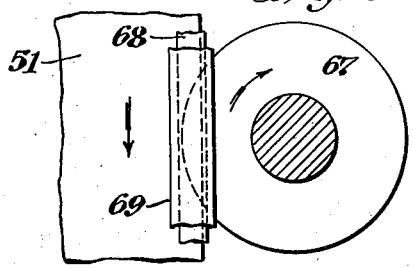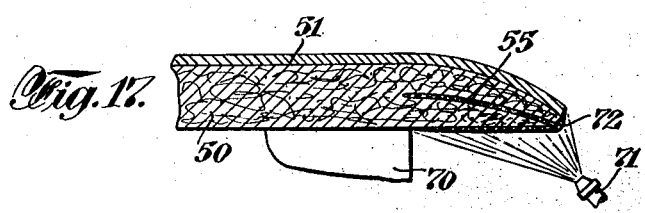
INVENTOR
FRANK M. ALLEN
BY Gordon C. Willard
ATTORNEY Dec. 26, 1939.  F. M. ALLEN  2,184,971
FLEXIBLE SMOOTH SURFACE RUG AND METHOD OF MAKING SAME
Original Filed Sept. 2, 1936   3 Sheets-Sheet 3
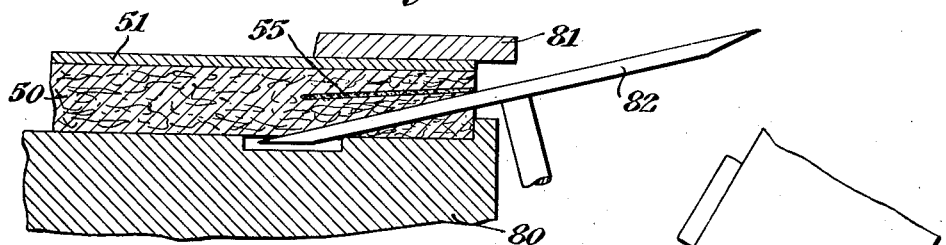
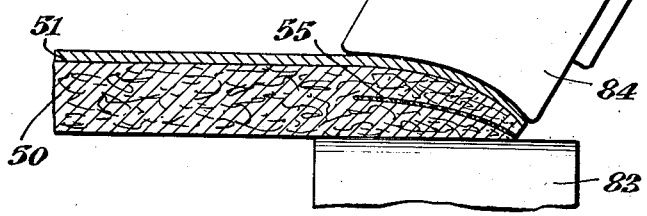
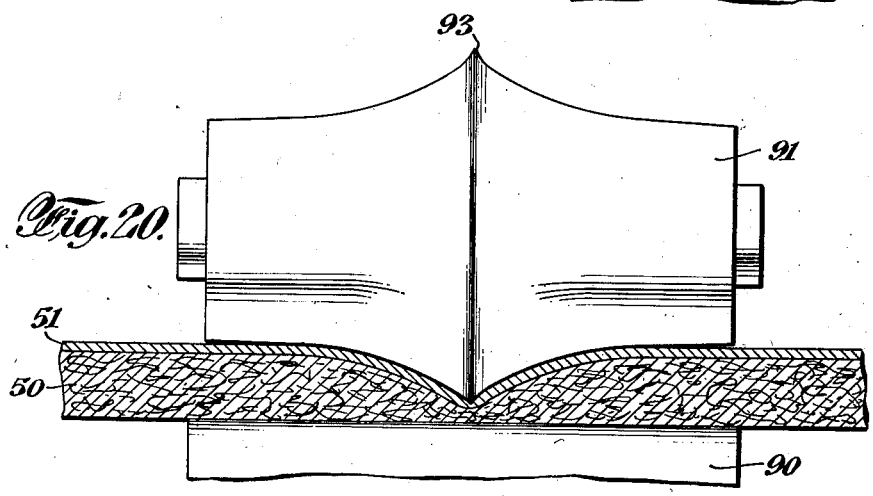
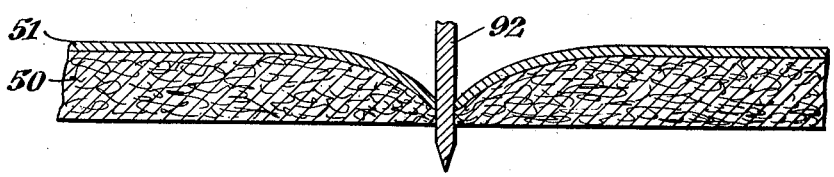
INVENTOR
FRANK M. ALLEN
BY
Gordon C. Willard
ATTORNEY Patented Dec. 26, 1939

2,184,971

UNITED STATES PATENT OFFICE 2,184,971

FLEXIBLE SMOOTH SURFACE RUG AND METHOD OF MAKING SAME

Frank M. Allen, Summit, N. J., assignor to Congoleum-Nairn Inc., a corporation of New York Application September 2, 1936, Serial No. 99,169
Renewed November 17, 1939

10 Claims. (Cl. 154—2)

This invention relates to flexible smooth-surface rugs and to method of making such rugs. This invention relates particularly to flexible smooth-surface rugs having a sheet-like base comprising a fibrous material impregnated with waterproofing material and a wear-resistant and decorative surface layer integral with a surface of the base sheet and suitable for covering a subsurface such as the surface of a floor.

The type of flexible smooth-surface rug which has been extensively manufactured and sold and in connection with which this invention may be advantageously illustrated includes a base sheet consisting of water-laid felt of some suitable fiber such as rag fiber or the like impregnated with a suitable material which is adapted to increase the water-resistance and strain-resistance of the felt, such as a bituminous saturant having a melting point of about 160° F. To one surface of the waterproofed felt base sheet there is applied a sealing coat which is adapted to resist bleeding of the saturant in the base sheet therethrough and which may, for example, comprise a suitable vehicle such as a drying oil or resin or both, together with a filler. Over the sealing coat, a surface coating or layer of wear-resistant and decorative material is applied. This coating or layer may comprise a suitable binder material such as a drying oil, or soluble cellulose derivative, or a resinous material together with solid material in the nature of finely-divided pigment, or inert filler, or both. This surface layer is usually applied in the form of paints of different color by means of a printing operation adapted to produce a desired surface design. Suitable decorative and wear-resistant coatings may comprise, for example, drying oil paint or enamel, cellulose ester lacquer, synthetic resin lacquer or molded composition, linoleum composition or the like. While the surface of such a rug is referred to as "smooth", the term "smooth-surface" is used to distinguish from rugs comprising pile fabrics, for example, and may include rugs having a surface layer of coating or molded composition which contains irregularities in the surface. Both the sealing coat and the surface coat or layer can be applied in one or more applications. The back of the rug is usually treated with some suitable protective composition, such as the composition used for the sealing coat, in order to render the back of the rug non-sticky and more attractive in appearance.

It is a purpose of this invention to improve upon flexible smooth-surface rugs such as the bituminized felt base rug above referred to by improving the resistance of the marginal portion thereof to injury and by improving upon the appearance of the rug along the margin thereof. It is also a purpose of this invention to afford a novel and useful method whereby the aforesaid improvements in the marginal portion of the rug may be effected.

Flexible smooth-surface rugs are particularly subject to injury along the marginal portions thereof. Rugs which have been in use for a considerable time often have the surface layer of wear-resistant and decorative material chipped or scuffed off irregularly adjacent the edge, leaving the edge portion very unsightly. Moreover, such rugs have heretofore been manufactured merely by trimming the edges thereof, leaving the edge portion of the base sheet, which edge portion is unsightly in appearance, exposed to view. According to the present invention, difficulties of the character just mentioned are largely removed.

In order to afford an understanding of this invention, it will be described in connection with certain illustrative embodiments thereof shown in the accompanying drawings, and further purposes, features and advantages of this invention will be apparent from the following description of this invention and of the embodiments thereof shown in the drawings, wherein—

Figure 1 is a plan view of a flexible smooth-surface rug embodying this invention;

Fig. 2 is a side sectional view of the marginal portion of a flexible smooth-surface rug embodying this invention;

Fig. 3 is a side sectional view of a portion of a rug to which this invention is applicable;

Figs. 4, 5 and 6 are side sectional views similar to Fig. 2 but of different modifications of this invention;

Fig. 7 is a side sectional view of a marginal portion of a rug prior to being treated according to this invention;

Fig. 8 is a side sectional view of a marginal portion of the rug shown in Fig. 7 with a diagrammatic representation of means for trimming the rug;

Fig. 9 is a side sectional view of the rug with a diagrammatic representation of means for slitting the edge of the rug;

Fig. 10 is a plan view of the structures shown in Fig. 9;

Fig. 11 is a side sectional view of the rug with a diagrammatic representation of means for introducing an adhesive into the recess in the edge of the rug;

Fig. 12 is a plan view of the structures shown in Fig. 11;

Fig. 13 is a side sectional view of the rug with a diagrammatic representation of means for imparting curvature to the margin of the rug;

Fig. 14 is a plan view of the structures shown in Fig. 13;

Fig. 15 is a side sectional view of the rug with a diagrammatic representation of means for cutting off a portion of the base sheet of the rug and for maintaining the curvature of the margin of the rug;

Fig. 16 is a plan view of the structures shown in Fig. 15;

Fig. 17 is a side sectional view of the rug with a diagrammatic representation of means for applying a coating composition to the margin of the rug;

Fig. 18 is a side sectional view of the rug with a diagrammatic representation of alternative means for cutting away a portion of the base sheet of the rug;

Fig. 19 is a side sectional view of the rug with a diagrammatic representation of alternative means for imparting curvature to the marginal portion of the rug;

Fig. 20 is a side sectional view of the rug with a diagrammatic representation of means for making a compressed marginal portion of the rug having curvature imparted to the surface thereof; and Fig. 21 is a side sectional view of the rug with a diagrammatic representation of means for trimming the rug after the surface of the marginal portion of the rug has been curved.

It is to be understood that the rugs shown in the drawings above mentioned are not drawn to scale and that the different layers and portions of the rug have been illustrated primarily from the point of view of clarity in indicating the different structural features of the rugs without attempt to accurately show the dimensions, size or relative proportions of the elements of the rug.

One embodiment of this invention is shown in Figs. 1 and 2. The flexible smooth-surface rug is indicated generally by the reference character 30 and consists of a base sheet 31 of felt impregnated with a waterproofing material. By waterproofing material, any material which is adapted to impart increased resistance to water of the fiber in the base is referred to. A bituminous material of an asphaltic character is usually desirable, although other waterproofing materials such as bodied drying oils, soluble cellulose compositions, solutions of synthetic resins or the like, may be used. Integral with the upper side of the felt base sheet is a wear-resistant and decorative layer 32. In this modification and in the other modifications of this invention herein described, the surface layer such as layer 32 may consist of a sealing coat 34 and a wear-resistant and decorative coating or layer 33, as shown in Fig. 3. Moreover, a suitable backing coating 41 may be employed as also shown in Fig. 3. Hereinabove, mention has been made of suitable materials which may be used in such portions of the wear-resistant and decorative surface layer and in the backing coat. In the drawings other than Fig. 3, e. g., in Fig. 2, the decorative and wear-resistant surface layer is shown as a single layer, but it is to be understood that this is done for convenience and clarity in the drawings and that the decorative and wear-resistant layer, such as the layer 32, may comprise one or more coatings as may be desired, and may include coatings of different materials. Likewise it is understood that the modifications shown in the drawings may include a backing coating applied in one or more layers of the same or different materials, although for convenience in description and clarity in the drawings this backing layer is omitted. The decorative and wear-resistant layer may include a desired design such as the design 35, part of which is shown in Fig. 1.

In the embodiment of this invention shown in Fig. 2, the base sheet 31 is tapered along the margin thereof. As will be described more in detail below, this is advantageously accomplished by cutting away some of the base sheet along the edge so that the marginal portion of the base sheet will be decreased in both thickness and in weight progressing toward the edge of the marginal portion, namely, in a direction toward the edge of the rug. Preferably the base sheet is tapered so as to be at most only about one-third as thick at the edge as in the body of the rug, although lesser amounts of taper such as result from having the base sheet only half as thick in the edge as in the body portion likewise affords advantages according to this invention. Preferably, the width of the tapered marginal portion of the base sheet is such as to be not more than about twice the maximum thickness of the base sheet. Over the tapered marginal portion of the base sheet, the surface layer 32 is caused to include a curved or bent portion 40, which bends downwardly away from the plane of this layer in the body of the rug. The surface layer of the rug preferably is continuously curved between the edge of the rug and the other side of the tapered portion of the base sheet and the preferred form of curvature is approximately that of a portion of a parabola, the greatest curvature being nearest the edge of the rug.

Along the edge portion of the rug, both underneath and extending up to the edge of layer 32, is a coating 39 of protective coating composition having some suitable base such as a soluble cellulose derivative, a drying oil or the like.

A rug of the character above described has definite advantages. For example, when a rug comprises a fibrous base sheet and a wear-resistant and decorative surface layer as above described, and when the base sheet is tapered along the edge so that the thickness of the edge portion at the margin of the rug is only about one-third to one-half the thickness of the base sheet in the body portion of the rug, and when the width of the marginal portion is less than about twice the maximum thickness of the base sheet, the surface layer being curved downwardly overlying the tapered portion of the base sheet, the rug has its resistance to chipping or scuffing greatly increased as compared with rugs heretofore manufactured wherein the edge of the body portion of the rug is formed merely by trimming the edges to give a square-cornered surface to the upper surface of the rug. Rugs wherein the surface layer has a downward curve according to this invention have been subjected to service tests in comparison with rugs having a square corner at the surface along the edge and have exhibited greatly diminished tendency of the surface layer to chip off along the edge. As this is one of the most serious defects in rugs of this character, this improvement is of much practical value.

In addition to affording greater resistance to chipping at the edges, the marginal tapering of the base sheet, so that the surface layer curves downwardly, gives an improved appearance to the edge portion of the rug. The curving of the decorative and wear-resistant layer imparts a more finished appearance to the rug and largely eliminates the visibility of the edge portion of the unsightly base sheet. The matter of improved appearance is important from the point of view of affording an article that is attractive to purchasers.

In Fig. 4, a rug structure is shown which is identical with that shown in Fig. 2, except that the rug structure shown in Fig. 4 includes a recess 36 in the edge of the rug. While the recess may terminate near the lower surface of the base sheet or even in the lower surface of the base sheet, the recess is regarded herein as being in the edge of the rug. The recess contains a water-resistant adhesive 42 which is adapted to maintain the opposed faces of the recess in juxtaposition at normal temperatures. Preferably such adhesive will be of the thermoplastic type fluid at elevated temperatures but adapted to harden quickly upon cooling to a tough flexible film that will not become embrittled with age. Furthermore, it should possess such viscosity when heated or such miscibility with the waterproofing material in the felt body as not to be absorbed excessively into such felt. Selected bituminous and pitch compounds, synthetic resins, as for example the alkyd resins, paracoumarone resin, chlorinated rubber, natural resins as for example ester gum, or various mixtures thereof with or without solvents have been found satisfactory for the purposes of this invention. An example of a preferred adhesive is as follows:

| | Parts |
|---|---|
| Phenol modified alkyd resin (plastic solid at 75° F.—fluid at 200° F.) | 50 |
| Chlorinated rubber (130 C. P.) | 7 |
| Paracoumarone resin (M. P. 80° F.) | 43 |
| | 100 |

The opposed faces of the recess preferably are somewhat sheared from their normal position (i. e., their relative registered position prior to deformation) and are united and maintained by the adhesive in such unregistered relation with respect to each other. Thus the face of the recess on the portion of the base below the recess is sheared toward the edge of the rug relatively to the face of the recess on the portion of the base above the recess. Uniting the faces of the recess in unregistered position tends to maintain the curvature of the surface of the rug above the recess.

In Fig. 5, an alternate modification of a rug embodying this invention is shown. In this embodiment, the rug includes a surface layer 32 and a base sheet 31. The marginal portion of the base sheet is tapered and the tapered portion of the base sheet diminishes in thickness but increases in density progressing toward the edge of the marginal tapered portion. The surface layer 32 includes a curved portion 40 overlying the tapered portion of the character hereinabove described. In the construction shown in Fig. 5, the edge of the rug has somewhat increased resistance to tearing due to the increased density of the base sheet at the edge as compared with the construction shown in Fig. 2, for example. On the other hand, with the construction shown in Fig. 2 the tapered portion of the base sheet tends to be more permanent in retaining its original taper.

In Fig. 6, an alternate modification of a flexible smooth-surface rug embodying this invention is shown. This modification may be similar to the modifications shown in Figs. 2, 4, or 5, and illustrates a rug wherein the recorative and wear-resistant surface layer 44 is thicker and may be made of some moldable composition, such as linoleum composition. The modification shown in Fig. 6 may be made with or without the recess 36.

Features of this invention also relate to certain steps employed in making flexible smooth-surface rugs which embody improvements of the character hereinabove referred to. By way of example, a rug to which this invention is applicable may be made by first forming a sheet of felted fiber as, for example, by some known process of making felt from an aqueous furnish to form a waterlaid felt sheet. The felt is then impregnated with a waterproofing material such as a bituminous saturant having a softening point of about 160° F. One or more sealing coats are applied directly to the impregnated felt base sheet. The sealing coat may be of any desired composition such as referred to hereinabove, and when two or more coats are applied, the different coats may be of the same or different compositions. Applied over the sealing coat or coats and on the side thereof remote from the base sheet, a decorative and wear-resistant layer or coating is applied which is made of some paint, lacquer or moldable composition such as those hereinabove referred to. The back of the rug is coated with some suitable protective coating material which may, for example, be similar in composition to the composition of the sealing coat. Such a method of manufacture may be employed in making a rug of the character shown in Fig. 3, for example. However, for purposes of convenience and clarity in the drawings, such a rug is to be regarded as illustrated by the rug shown in Fig. 7 which is shown as comprising the base sheet 50 and a decorative and wear-resistant surface layer 51. Moreover, other methods may be used for forming a smooth-surface rug structure or a structure comprising a base sheet and a decorative and wear-resistant surface layer, and it is to be understood that the base sheet and surface layers may be made of any desired and appropriate materials assembled in any desired way to afford a flexible smooth-surface rug.

One method of manufacturing a flexible smooth-surface rug will be described in connection with Figs. 7 to 17. In Fig. 7, a marginal portion of a smooth-surface rug is shown as originally made up and before it has been trimmed. The rug is then trimmed by cutting off a portion of the rug as by means of some suitable knife or guillotine 52 which is adapted to give the rug a clean-cut and regular edge portion 53 as shown in Fig. 8.

In making a rug having the improvements hereinabove referred to, the edge 53 of the rug is preferably subjected to a slitting operation by means of a suitable cutting device such as that shown in Figs. 9 and 10 in which the slitting operation is shown as being performed by a knife 54 which makes a slit or recess 55 in the edge 53 of the rug. The rug is then subjected to an operation wherein there is introduced into the recess 55 in liquid form some water-resistant adhesive such as an adhesive of the character above mentioned which is adapted to harden to bond the faces of the slit together again and maintain them in juxtaposition. For this purpose, any suitable device such as the device shown in Figs.

11 and 12 may be used, comprising injector 56 which is adapted to be inserted in a slit or recess and which has a conduit 57 therein that is adapted to discharge the adhesive adjacent the end of the injector so as to leave a substantial amount of adhesive 58 within the recess.

Before the adhesive has had a chance to fully harden, the next operation is one wherein the marginal portion of the covering is bent or curved downwardly. This may be accomplished in any desired way such as in the manner illustrated in connection with Figs. 13 and 14. The rug is positioned relatively to a support 63 so as to have the marginal portion which includes the recess 55 overlying the edge of the support 63. The marginal portion of the rug is then curved downwardly by the rollers 64, 65 and 66 having concave peripheral surfaces which conform to the curvature that it is desired to impart to the margin of the rug. Preferably, the different portions of the curved margin are acted upon by the rollers in sequence. During the bending operation, the presence of the recess 55 in the edge of the base is of great value in permitting a high degree of curvature to be imparted to the upper surface of the rug without injuring the decorative and wear-resistant surface layer or reducing the thickness thereof due to the fact that the neutral axis of the portion of the rug which remains integral with the surface layer and which overlies the recess is brought much nearer the surface layer, with the result that the strain on, and tendency to crack of, the surface layer are greatly diminished. Moreover, it is preferable to have some material in the recess which acts as a lubricant during the bending operation, and for this reason it is desirable to carry out the bending operation before the adhesive hardens and while it is still sufficiently liquid to act as a lubricant so that the faces of the recess 55 may readily slide relatively to each other during the bending operation. During the bending operation, the faces of the recess 55 are, of course, pressed together and to some extent the marginal portion of the base sheet is consolidated and compressed. Preferably, the recess 55 is positioned quite close to the surface layer and not spaced therefrom by more than half the thickness of the base so as to bring the neutral axis of the portion of the base sheet lying between the recess 55 and the surface layer as close as possible to the surface layer 51, as in this manner the danger of breaking the surface layer is greatly minimized.

In order that the bottom surface of the rug may lie flat on a subsurface and still maintain the curvature which has been imparted to the surface layer, the base sheet is subjected to a cutting operation which cuts off a part of the base sheet along the margin of the rug and underneath the recess. The cutting may be accomplished in any desired way, such as that illustrated in Figs. 15 and 16. While the margin of the rug overhangs a support, e. g., support 63, it is caused to pass in operative relation with respect to a suitable cutting device such as rotary knife 67 which cuts off the portion of the rug that has been bent downwardly below the bottom surface of the rug. The cutting is preferably at such plane that the rug after its completion will lie flat on a subsurface along the margin thereof and will preserve a desired amount of curvature in the surface layer of the rug along the margin. In order to maintain the rug in desired position during the cutting operation, a moving belt 68 may be used having a curvature conforming to the curvature of the margin of the rug, which belt is kept in proper spaced relation with respect to support 53 by fixed shoe 69. The curved belt or other equivalent device is also useful in maintaining the curved position of the margin of the rug over an interval of time sufficient to permit the adhesive in the recess 55 to set and bond the faces of the recess together.

It is desirable to coat the portion of the bottom and edge of the rug which has been subjected to the cutting operation above described. This may be done in any suitable manner. For example, the rug, while projecting over a suitable support or shield 70, may come into operative relationship with a spray device 71 which sprays a suitable lacquer 72 along the edge portion of the rug. This lacquer may be any quick-drying and flexible lacquer such as a lacquer having a soluble cellulose ester base, e. g., cellulose nitrate. Alternatively, a lacquer can be used which is prepared from a drying oil by oxidizing the drying oil and then removing from the oxidized oil those constituents which are non-hardening or unoxidized or both, so that the composition can dry merely by evaporation of solvents in which the oxidized fluid oil components are dissolved. Such marginal finishing coat is effective to prevent the marginal portion of the rug from sticking to a sub-surface on which the rug may be laid, affords a seal at the mouth of the recess 55, and gives the marginal portion of the rug an improved appearance. Furthermore such coating may be of a composition to give it the property of shrinking upon drying, this property also being effective in causing the tapered edge portion to curve downward and the bottom of such edge portion to lie flat on a subsurface.

After a rug has been subjected to the process above described and illustrated in connection with Figs. 7 to 17, it may, for example, be of the type hereinabove described in connection with Fig. 4.

An alternate way of making a rug according to this invention may be illustrated in connection with Figs. 18 and 19 when taken with Figs. 7 to 12. The rug may be made up initially and trimmed along an edge, and thereafter the edge may have a recess formed therein which has an adhesive introduced therein as described above and illustrated in connection with Figs. 7 to 12. Thereafter the margin of the rug may be subjected to a cutting operation wherein the portion of the base sheet adjacent the edge thereof is cut away in some suitable manner such as that illustrated in connection with Fig. 18. To this end, the rug which as aforesaid comprises the base sheet 50 and the surface layer 51 is moved between a suitable support 80 and a guide member 81. The under side of the margin of the rug is cut off diagonally by means of any suitable device such as the rotary knife 82. The rug which has been subjected to such an operation could be used immediately and in use would tend to have the margin become bent down along the edge so as to approach an ultimate structure along the margin analogous to that shown in Fig. 4, for example. It is preferable, however, to follow the cutting operation by a compression operation wherein the margin of the rug is bent or curved downwardly. This may be done in any suitable way such as that illustrated in connection with Fig. 19. To this end, the margin of the rug may be compressed between two rollers, namely, roller 83, which is underneath the rug, and roller 84 which has a concave periphery corresponding to the curvature that is desired for the margin of the rug. In this manner, the margin of the rug can be subjected to pressure which presses the faces of the recess 55 together and at the same time bends the upper surface of the rug downwardly so that the rug assumes a structure corresponding to that shown in Fig. 4, for example.

The method just described, namely, in connection with Figs. 18 and 19, accomplishes tapering of the marginal portion of the base sheet by combining cutting away of a portion of the base sheet, with positive compression of the base sheet along the margin. In such operation and in the operation illustrated in connection with Figs. 13 to 16, it may be noted that the face of the recess 55 on the portion of the base underneath the recess is sheared toward the edge of the rug relatively to the face of the recess on the portion of the base above the recess during the bending operation. The faces of the recess are maintained in this nonregistering position by means of the adhesive interposed between the faces.

In making the rug as hereinabove described, one can omit the steps described above and illustrated in connection with Figs. 9 to 12. Moreover, the operation shown in Figs. 9 and 10 may be included, while omitting the steps illustrated in connection with Figs. 11 and 12. Thus it is possible to eliminate the slitting operation altogether and bend the rug as described above and illustrated in connection with Figs. 13 and 14, thereafter cutting away a portion of the base sheet as illustrated in connection with Figs. 15 and 16. Alternatively, the rug after it has been trimmed may have a portion of the base sheet cut off along the margin as illustrated in Fig. 18, the margin of the rug thereafter being bent downwardly in use or in a bending operation as illustrated above in connection with Fig. 19. In such case, a rug of the character shown in Fig. 2, for example, could be produced. However, for reasons hereinabove mentioned, the slitting of the edge of the base sheets of the rug, so as to move the neutral axis of the recessed portion of the base sheet nearer the surface layer of the rug, is to be preferred, as there is less danger of injury to the surface layer of the rug and more permanent curvature of the margin can be obtained.

As hereinabove stated, one can include the slitting operation and omit the operation wherein an adhesive is introduced into the recess formed by the slitting operation. In such case, the product would be similar to that shown in Fig. 4, for example, omitting, however, an added adhesive in the recess. When a base sheet is used in the rug, such as a sheet of felt impregnated with a bituminous saturant, the saturant at the opposed faces of the recess to some extent acts as an adhesive so as to maintain the opposed faces of the recess in juxtaposition, even though no other adhesive is used. This effect can be augmented by using a heated plow following the slitting operation, the plow being heated sufficiently to melt the bituminous material in the felt of the base sheet. In such case, the melted bituminous material on the opposed faces of the recess would serve to some extent as an adhesive to maintain these faces in juxtaposition after they have been pressed together while the bituminous material is still in a melted or partially melted condition.

A modified method of making a flexible smooth-surface rug in the practice of this invention is illustrated in connection with Figs. 20 and 21. In this modification, a rug is produced which may, for example, be of the character shown in Fig. 5, which has been described hereinabove. In this modification, a rug structure—including, for example, the base sheet 50 and the wear-resistant and decorative surface layer 51—is subjected to an operation which by compression imparts a tapered marginal portion to the base sheet and a downward curvature to the surface layer of the rug. This may be accomplished by any suitable way as by the means shown in Fig. 20. The rug structure is passed between a pair of rollers, one roller 90 being underneath the rug and the other roller 91 being above the rug. The roller 91 has a peripheral surface which conforms to the curvature that is desired for the margin of the rug and which preferably comes to a pointed intermediate peripheral ridge 93. After this operation, the rug can be trimmed off preferably at the lowest point in the downward curvature of the surface layer by any suitable means such as by means of the trimming knife or guillotine 92 which is shown in Fig. 21. When the base sheet of the rug has a tapered portion imparted thereto along the margin thereof by means of pressure in the manner illustrated above in connection with Figs. 20 and 21, it is desirable to have the base sheet of a somewhat porous character so that it lends itself to relatively extensive as well as permanent consolidation along the margin thereof.

While this invention has been described in connection with flexible smooth surface rugs of the type having a decorative and wear resistant surface layer in addition to a base sheet, many features of this invention are applicable when the wear resistant and decorative layer is omitted or when the base sheet itself constitutes the wear-resistant and decorative surface. Thus many of the features of this invention may be availed of in connection with flexible smooth surface coverings comprising fibrous material such as felt, impregnated with a waterproofing material, e. g., bituminous material, drying oils, cellulose lacquers, synthetic resins or the like, whether or not the covering has a separate and distinct surface layer or layers integral with one or both surfaces thereof and whether or not the fibrous base sheet may have a distinctive design impregnated therein; and the terms "flexible smooth-surface rug" and "rug body" are applicable to any such coverings.

While this invention has been described in connection with certain illustrative embodiments thereof, it is to be understood that this has been done merely for the purpose of exemplification thereof and that the scope of this invention is to be limited only by the following claims.

I claim:

1. A flexible smooth-surface rug which comprises a sheet-like base comprising fibrous material impregnated with a waterproofing material, a decorative and wear-resistant surface layer which contains a filler and a binder selected from drying oils, cellulose esters, and synthetic resins and which is integral with a surface of said base, said base including a marginal tapered portion along an edge thereof which becomes of substantially decreased thickness and weight progressing toward said edge.

2. A flexible smooth-surface rug which comprises a sheet-like base comprising fibrous material impregnated with a waterproofing material, a decorative and wear-resistant surface layer which contains a filler and a binder selected from drying oils, cellulose esters, and synthetic resins and which is integral with the upper surface of said base, said base including a marginal tapered portion along an edge thereof which becomes of substantially decreased thickness and weight progressing toward said edge and the portion of said surface layer overlying said tapered portion of said base being bent downwardly progressing toward said edge, there being a coating of protective coating composition applied to said base sheet along and adjacent the edge thereof.

3. A flexible smooth-surface rug which comprises a sheet-like base comprising felt impregnated with a waterproofing material and a decorative and wear-resistant surface layer integral with the upper surface of said base, an elongated recess extending laterally into said base adjacent an edge thereof with opposed faces of said recess in juxtaposition, a water-resistant adhesive in said recess between said opposed faces of said recess, said opposed faces being maintained in juxtaposition by said adhesive with portions of said opposed faces out of normal registration so that part of the face of the portion of the base below the recess is sheared toward said edge relatively to the corresponding part of the face of the portion of said base above said recess, said base including a marginal tapered portion of substantially reduced thickness along said edge and the portion of said surface overlying said tapered portion of said base being bent downwardly progressing toward said edge.

4. A flexible smooth-surface rug which comprises a sheet-like base consisting of a unitary sheet of felt impregnated with a bituminous saturant, a sealing coat applied directly to the upper surface of said base, a decorative and wear-resistant surface material overlying said sealing coat on the surface thereof remote from said base, an elongated recess extending laterally into said base adjacent an edge thereof with opposed faces of said recess in juxtaposition and a water-resistant adhesive in said recess adapted to maintain said opposed faces thereof in juxtaposition, said base including a marginal tapered portion having substantially reduced thickness along said edge and the portion of said decorative and wear-resistant material over said tapered portion of said base being bent downwardly progressing toward said edge.

5. A method of making a flexible smooth-surface rug which comprises making a rug structure including a sheet-like base of fibrous material impregnated with a waterproofing material and a decorative and wear-resistant surface layer integral with a surface of said base sheet and cutting away a marginal portion of said base which is along an edge of said rug structure from intermediate the thickness of said edge diagonally to the side of said base remote from said surface layer leaving the marginal portion of said base tapered so as to be thinnest at said edge.

6. A method of making a flexible smooth-surface rug which comprises making a rug structure including a sheet-like fibrous base impregnated with a waterproofing material and a wear-resistant and decorative surface layer integral with the upper surface of said base, cutting away a marginal portion of said base sheet along an edge of said rug structure on the opposite side thereof from said surface layer, leaving a tapered marginal portion of said base sheet which is thinnest along said edge and then bending the portion of the surface layer overlying said tapered portion of said base downwardly progressing toward said edge.

7. A method of making a flexible smooth-surface rug which comprises making a rug structure including a sheet-like fibrous base impregnated with a waterproofing material and a wear-resistant and decorative surface layer integral with the upper surface of said base, bending a marginal portion of said rug structure along an edge thereof downwardly progressing toward said edge and then cutting away a portion of said base along said edge and on the opposite side of said base from said surface layer leaving a tapered marginal portion of said base which is thinnest along said edge.

8. A method according to claim 6 and wherein said base is slit adjacent said edge thereof to form an elongated recess extending laterally into said base from said edge thereof before said surface layer overlying said tapered portion is bent downwardly.

9. A method according to claim 7 and wherein said base is slit adjacent said edge thereof to form an elongated recess extending laterally into said base from said edge thereof before said marginal portion of said rug structure is bent downwardly.

10. A method of making a smooth surface rug which comprises the steps of making a rug structure including a sheetlike base of fibrous material impregnated with a waterproofing material and a decorative and wear-resistant surface layer integral with one surface of said base sheet, slitting said base sheet adjacent the edge thereof to form an elongated recess extending laterally into said base sheet with opposed surfaces of said recess in juxtaposition, introducing an adhesive in fluid condition into said recess, bending the edge portion of said rug structure surrounding said recess downwardly progressing toward the edge while said adhesive is in fluid condition, cutting away the marginal portion of said base which is along the edge of said rug structure from intermediate the thickness of said edge diagonally to the side of the base remote from said surface layer leaving the marginal portion of said base comprising said recess tapered so as to be thinnest along said edge and the surface layer overlying said tapered portion of said base bent downwardly progressing toward said edge.

FRANK M. ALLEN.